United States Patent Office 3,125,608
Patented Mar. 17, 1964

3,125,608
PURIFICATION OF VINYL CHLORIDE
David W. McDonald, Texas City, Tex., assignor to Monsanto Chemical Company, St. Louis, Mo., a corporation of Delaware
No Drawing. Filed Dec. 22, 1960, Ser. No. 77,515
2 Claims. (Cl. 260—656)

The present invention relates to a method for purifying vinyl chloride and, more particularly, to a method for removing minor amounts of butadiene from vinyl chloride.

As is well known, vinyl chloride, a monomer of considerable commercial importance, is produced by the addition reaction of acetylene and hydrogen chloride in the presence of suitable catalysts. The acetylene employed if derived from hydrocarbons usually contains minor quantities of contaminants among which is butadiene. This diolefin impurity is carried through the system and the vinyl chloride product recovered from such processes contains minor amounts of butadiene, i.e., amounts up to about 200 parts per million, because butadiene is not separated from vinyl chloride by the usual distillation techniques used for purifying the monomer. While at first glance such quantites appear so small as to be unimportant, it has been determined that only traces of butadiene, i.e., 5 p.p.m. or less, act to inhibit the polymerization rate of vinyl chloride significantly and because of this effect the diene cannot be tolerated in the monomer.

Accordingly, it is an object of the present invention to provide a simple, commercially feasible method for purifying vinyl chloride to obtain a product essentially free from butadiene and thus eminently suitable for conversion at efficient rates to high-quality polyvinyl chloride. This and other objects and advantages of the invention which will become apparent from the following description thereof are attained by treating vinyl chloride in the vapor phase with hydrogen in the presence of a suitable catalyst.

The catalysts utilizable in the process of the invention are those containing catalytically active metals of group VIII of the periodic table and particularly nickel, palladium and platinum. The catalytically active metal is preferably employed deposited on an inert supporting material such as pumice, alumina, diatomaceous earth, kieselguhr, silica gel, charcoal, zeolite, asbestos, etc. Such catalysts are commerically available in a number of different forms having varying metallic content or can be prepared by conventional methods. In a suitable method, the supporting material is impregnated with an aqueous solution of the desired metal nitrate, the resulting mixture is heated to drive off the water and roasted to convert the nitrate to the oxide which is then hydrogenated to reduce the metal oxide on the support to the catalytically active metal. Similarly, other metal compounds such as hydroxides, carbonates or halides of the catlaytic metals which are convertible to metal oxides by heating or by heating in air can be used. Catalytic compositions can likewise be prepared by blending together finely divided inert supporting materials either with solutions of or dry compositions of the necessary metal salts, pressing the resulting mixtures in suitable shapes such as pellets, for example, and then heating, roasting and reducing the composition to obtain the active catalytic material.

Suitable catalytic compositions for the present invention contain from about 0.05 to about 5% by weight of the catalytically active metal.

The hydrogenation is preferably effected with fixed bed catalysts. However, the monomer may also be treated in the presence of a moving mass of catalyst or in the well known "fluidized" operation.

The amount of catalyst required and the contact time employed are interrelated and depend upon factors such as the particular catalyst employed, the physical mode in which the catalyst is employed, the temperature, the degree of contamination in relation to the degree of purification to be effected, and the like. With the more active catalysts, for example, more vinyl chloride per unit volume of catalyst per hour can be treated effectively. Contrariwise, with the less active catalysts, more of the catalyst will be required to attain the same efficiency in up-grading the same amount of vinyl chloride. Thus, the amount of catalyst actually employed varies widely. Generally, it may be said that from about 100 ml. to about 200 ml. of vinyl chloride per ml. of catalyst per hour gives satisfactory removal of butadiene.

In the preferred embodiment of the present invention, a gaseous stream of vinyl chloride containing butadiene as an impurity is admixed with a stream of hydrogen and the resulting mixture is passed in contact with the above-described catalysts. The amount of hydrogen necessary is merely that sufficient to hydrogenate all the butadiene present, although an excess over that theoretically required to react with all the butadiene is preferred for practical operation. Generally, at least about one mol of hydrogen per mol of butadiene is sufficient for the purification reaction but preferably from about 10 to about 50 mols of hydrogen per mol of contained butadiene in the vinyl chloride is employed.

The temperature necessary in the treating zone also depends to some extent upon the particular catalyst employed. In general, temperatures in the range from about 60° C. to about 250° C. can be employed. With a preferred catalyst such as palladium supported on activated alumina the temperature is maintained between 150° C. and 200° C.

Pressure does not appear to be a critical factor and can be at, above, or below atmospheric pressure.

The following example serves to illustrate further the process of the invention but it is not to be construed as limiting the invention in any manner whatsoever.

EXAMPLE

A glass tube about 10 in. long and 1½ in. in outside diameter was employed as the reactor. The tube was charged with 200 ml. of a catalyst manufactured by the Girdler Company, and marketed under the trade designation "G–46" which was comprised of about 0.05% by weight of palladium supported upon activated alumina. The reactor was immersed in an oil bath which was heated by means of a heating mantle. A portion of the inlet gas manifold connected to the bottom of the reactor formed a dip leg which was disposed within the oil bath and functioned as a preheater to bring the reactant gas mixture up to approximately reaction temperature just prior to its entry into the heated catalyst bed. Vinyl chloride and hydrogen were fed through calibrated rotameters into the gas inlet manifold where they were mixed and then the gas mixture was passed through the catalyst bed maintained at the desired temperature at a given flow rate. The effluent gas was condensed and collected in a vented Dry Ice trap. The vinyl chloride was analyzed both before and after treatment for butadiene content by means of a gas chromatograph to determine the effectiveness of the treatment. In some instances for testing purposes, the vinyl chloride was "spiked" with butadiene while in others the so-called product vinyl chloride from a commercial plant was treated. A series of runs were made in the foregoing manner using various temperatures and flow rates. Results of these together with the conditions employed are presented in Table I below.

Table I

| Vinyl Chloride (ml./min.) | H₂ (ml./min.) | Temp., °C. | Ml. VCM¹/ ml. Cat./ hr. | Butadiene Content (p.p.m.) | |
|---|---|---|---|---|---|
| | | | | Before | After |
| 900 | 9 | 200 | 270 | 307 | 63 |
| 450 | 9 | 175 | 135 | 307 | 0 |
| 900 | 20 | 225 | 270 | 137 | 27 |
| 450 | 9 | 200 | 135 | 274 | 0 |
| 450 | 9 | 150 | 135 | 274 | 0 |
| 900 | 0 | 175 | 270 | 137 | 79 |

¹ Vinyl chloride.

What is claimed is:

1. A process for the purification of vinyl chloride containing minor amounts of butadiene which comprises heating said vinyl chloride with hydrogen at a temperature from about 60° C. to about 250° C. in the presence of a catalyst consisting essentially of a catalytically active metal of group VIII of the periodic table supported upon an inert carrier and recovering vinyl chloride substantially free of butadiene.

2. A process for the purification of vinyl chloride containing minor amounts of butadiene which comprises heating said vinyl chloride with hydrogen at a temperature from about 150° C. to about 200° C. in the presence of a catalyst consisting essentially of palladium supported on activated alumina and recovering vinyl chloride substantially free of butadiene.

References Cited in the file of this patent
UNITED STATES PATENTS

| 2,616,883 | Marous | Nov. 4, 1952 |
| 2,705,732 | Braconier et al. | Apr. 5, 1955 |
| 2,886,605 | McClure et al. | May 15, 1959 |

OTHER REFERENCES

Young et al.: J.A.C.S., vol. 69, pages 2046–2050 (1947).